US012669145B2

(12) United States Patent
     Asik

(10) Patent No.: US 12,669,145 B2
(45) Date of Patent: Jun. 30, 2026

(54) HOOK LOCK AND METHOD

(71) Applicant: Custom Fabricating & Supplies, Franklin, WI (US)

(72) Inventor: Brian P. Asik, Franklin, WI (US)

(73) Assignee: Custom Fabricating & Supplies, Franklin, WI (US)

( * ) Notice: Subject to any disclaimer, the term of this patent is extended or adjusted under 35 U.S.C. 154(b) by 98 days.

(21) Appl. No.: 18/917,714

(22) Filed: Oct. 16, 2024

(65) Prior Publication Data

US 2025/0035149 A1    Jan. 30, 2025

Related U.S. Application Data

(62) Division of application No. 17/842,159, filed on Jun. 16, 2022, now Pat. No. 12,196,247.

(51) Int. Cl.
     F16B 45/02        (2006.01)

(52) U.S. Cl.
     CPC .................................. F16B 45/027 (2021.05)

(58) Field of Classification Search
     CPC ...................................................... F16B 45/027
     See application file for complete search history.

(56) References Cited

U.S. PATENT DOCUMENTS 1,046,795 A * 12/1912 Johnson ................ F16B 45/045
                                                    294/82.21
1,654,789 A * 1/1928 Clegg .................... E01B 11/38
                                                    411/130

1,916,733 A * 7/1933 Light ........................ A44B 1/20
                                                    5/655.6
2,633,733 A * 4/1953 Boden ................... F16B 45/027
                                                    24/598.2
2,849,776 A * 9/1958 Bahr ..................... F16B 45/034
                                                    24/116 R
3,077,218 A * 2/1963 Ziegler ................... F16B 39/24
                                                    411/161
3,285,482 A * 11/1966 Bedaul, Sr. ............... A45F 5/02
                                                    224/268
3,289,992 A * 12/1966 Brooks ................. A47F 5/0823
                                                    248/222.51
3,765,117 A * 10/1973 Gibson, Sr. ............ A01K 83/00
                                                    43/43.4
3,797,313 A * 3/1974 Renholts ................ G01N 19/10
                                                    73/335.13
5,011,351 A * 4/1991 Terry ...................... F16B 39/24
                                                    411/161

(Continued)

*Primary Examiner* — David M Upchurch
(74) *Attorney, Agent, or Firm* — Boyle Fredrickson, S.C.

(57) ABSTRACT

A hook lock and method are provided for retaining a workpiece on a hook of an industrial rack. The hook includes a shank having a cross-sectional width, defining a bend for receiving the workpiece thereon, and terminating at a terminal end. The hook lock includes a block having a passageway extending along an axis between first and second outer surfaces of the block. The passageway has a cross-sectional width less than or equal to the cross-sectional width of the shank. In operation, the hook is inserted through the workpiece, and thereafter, through the passageway in the block such that the block is frictionally retained on the shank of the hook. The block prevents the workpiece from being disengaged from the hook as the workpiece is transported along a line.

15 Claims, 5 Drawing Sheets

(56)                    References Cited

U.S. PATENT DOCUMENTS

| | | | | |
|---|---|---|---|---|
| 5,913,479 | A * | 6/1999 | Westwood, III | B66C 1/36 |
| | | | | 24/600.9 |
| 5,960,967 | A * | 10/1999 | Neil | A47H 1/144 |
| | | | | 211/94.01 |
| D459,979 | S * | 7/2002 | Goodman | D8/372 |
| D469,682 | S * | 2/2003 | Gary | D8/367 |
| 2006/0130539 | A1 * | 6/2006 | Yu | F16B 45/023 |
| | | | | 70/18 |
| 2009/0100865 | A1 * | 4/2009 | Van Guelpen | A44C 7/002 |
| | | | | 63/1.11 |
| 2009/0192617 | A1 * | 7/2009 | Arramon | A61F 2/4425 |
| | | | | 623/17.13 |
| 2011/0056115 | A1 * | 3/2011 | Sebile | A01K 95/00 |
| | | | | 43/44.81 |
| 2011/0098816 | A1 * | 4/2011 | Jacob | A61B 17/7055 |
| | | | | 623/17.11 |
| 2011/0215120 | A1 * | 9/2011 | Blake | A45F 5/00 |
| | | | | 224/267 |
| 2013/0277524 | A1 * | 10/2013 | Fathi | F16B 45/06 |
| | | | | 248/308 |
| 2016/0281766 | A1 * | 9/2016 | Moine | F16B 45/023 |
| 2018/0216656 | A1 * | 8/2018 | Bailey | B60C 27/10 |

* cited by examiner

HOOK LOCK AND METHOD

CROSS-REFERENCE TO RELATED APPLICATION

This application is a divisional of U.S. application Ser. No. 17/842,159, filed Jun. 16, 2022, the entirety of which is incorporated here by reference.

FIELD OF THE INVENTION

This invention relates generally to industrial coating, and in particular, to a hook lock and method for retaining a workpiece on a hook of an industrial rack as the workpiece travels along a line during an industrial coating process.

BACKGROUND AND SUMMARY OF THE INVENTION

In an industrial coating process, a workpiece or part to be coated is hung on a rack utilizing a specially designed product holder or hook. The workpiece is then transported along a line and subjected to various combinations of cleaning, coating and finishing processes. For example, in an E-coating process, a workpiece is initially mounted on the hook and electrostatically charged (e.g. grounded) through contact therewith. In order to pre-treat the surfaces of the workpiece before application of the coating, the workpiece is transported along a line wherein the workpiece is dipped into one or more submersion tanks for cleaning. Typically, the one or more separate submersion tanks include mild acids to etch and clean the workpiece. The workpiece continues along the line and is immersed or dipped in a subsequent submersion tank including ionized coating particles having a charge which is opposite that of the workpiece such that the coating is deposited onto the workpiece surfaces by charge attraction. The workpiece is then removed from the subsequent submersion tank for further processing.

It can be appreciated as the workpiece is transported along the line and immersed in the submersion tanks, there exists an opportunity for the workpiece to be either blown, float, or simply vibrate off the hook. This interruption in the conveyance of the workpiece along the line may result in production downtime, loss of inventory, and/or additional safety concerns. In order to maintain the workpiece on a corresponding hook during the transport thereof, various solutions have been developed. For example, complex and expensive hook and rack systems have been designed which are specific to each workpiece. These hook and rack systems lock the workpiece in place as the workpiece is transported along the line. While functional for their intended purpose, these prior hook and rack systems are expensive to design, expensive to manufacture, take a long time to make, need to be maintained (repaired and burnt clean), are harder to install parts on, and take up valuable warehouse space.

Alternatively, in order to maintain the workpiece on a corresponding hook during the transport thereof, the workpiece may be tethered to the rack of the hook and rack system. More specifically, a metal wire is twisted around a hole in the workpiece and back around the rack. The processes for installing and removing the metal wire are very laborious and also are potentially dangerous for the worker. For example, a worker may incur injuries ranging from, but not limited to, cuts from the sharp ends of the metal wire to strains from the continuous twisting of the metal wires by hand. In view of the foregoing, there exists a need for a simple and effective means for maintaining the workpiece on a corresponding hook of a hook and rack system during the transport thereof.

Therefore, it is a primary object and feature of the present invention to provide a hook lock for retaining a workpiece on a hook of an industrial rack as the workpiece travels along a line during an industrial coating process.

It is a further object and feature of the present invention to provide a hook lock and method for retaining a workpiece on a hook of an industrial rack as the workpiece travels along a line during an industrial coating process which may be used in conjunction with various, known, hook and rack systems.

It is a still further object and feature of the present invention to provide a hook lock and method for retaining a workpiece on a hook of an industrial rack as the workpiece travels along a line during an industrial coating process which is simple to utilize and inexpensive to manufacture.

In accordance with the present invention, a hook lock is provided for retaining a workpiece on a hook of an industrial rack. The hook includes a shank having a cross-sectional width, defining a bend for receiving the workpiece thereon, and terminating at a terminal end. The hook lock includes a block having a first generally convex outer surface and a second generally convex outer surface. A passageway extends along an axis between the first and second outer surfaces of the block and includes a first open end and a second open end. The passageway has a cross-sectional width less than or equal to the cross-sectional width of the shank. A concave depression is in the first outer surface. The concave depression extends about the first open end of the passageway.

The concave depression may be a first concave depression and the block may include a second concave depression in the second outer surface. The second concave depression extends about the second open end of the passageway. The first outer surface and the second outer surface terminate at corresponding outer peripheries. The block further includes an outer peripheral surface interconnecting the outer periphery of the first outer surface and the outer periphery of the second outer surface. The outer peripheral surface has a generally cylindrical configuration. It is contemplated for the block to be fabricated from a resilient material.

In accordance with a further aspect of the present invention, a method is provided for retaining a workpiece on a hook of an industrial rack. The hook includes a shank having a cross-sectional width and terminating at a terminal end. The method includes the steps of inserting the terminal end of the hook through the workpiece and inserting the terminal end of the hook through a passageway extending through a block. The passageway has a cross-sectional width less than or equal to the cross-sectional width of the shank such that the block is frictionally retained on the shank of the hook.

The block has a first generally convex outer surface and a second generally convex outer surface. The passageway extends along an axis between the first and second outer surfaces of the block and includes a first open end and a second open end.

The block includes a concave depression in the first outer surface. The concave depression is defined by a guide surface extending about the first open end of the passageway. The method may include the additional step of guiding the terminal end of the hook along the guide surface to the first open end of the passageway prior to inserting the terminal end of the hook through the passageway. The concave depression may be a first concave depression and the guide surface may be a first guide surface. The block may include a second concave depression in the second outer surface. The second concave depression is defined by a second guide surface extending about the second open end of the passageway. The method may include the additional step of guiding the terminal end of the hook along the second guide surface to the second open end of the passageway prior to inserting the terminal end of the hook through the passageway.

In accordance with a still further aspect of the present invention, a method for maintaining a workpiece on a hook of an industrial rack as the workpiece travels along a line during industrial coating process. The hook includes a shank having a cross-sectional width and terminating at a terminal end. The method includes the steps of inserting the terminal end of the hook through the workpiece and inserting the terminal end of the hook through a passageway extending through a block. The passageway has a cross-sectional width less than or equal to the cross-sectional width of the shank such that the block is frictionally retained on the shank of the hook. The workpiece is prevented from becoming disengaged from the hook by the block as the workpiece transported along the line. The block is removed from the shank of the hook and the workpiece may be removed from the hook.

The block has a first generally convex outer surface and a second generally convex outer surface. The passageway extends along an axis between the first and second outer surfaces of the block and includes a first open end and a second open end. A concave depression may be provided in the first outer surface. The concave depression is defined by a guide surface extending about the first open end of the passageway. The method may include the additional step of guiding the terminal end of the hook along the guide surface to the first open end of the passageway prior to inserting the terminal end of the hook through the passageway. The concave depression may be a first concave depression and the guide surface may be a first guide surface. The block may include a second concave depression in the second outer surface. The second concave depression is defined by a second guide surface extending about the second open end of the passageway. The method may include the additional step of guiding the terminal end of the hook along the second guide surface to the second open end of the passageway prior to inserting the terminal end of the hook through the passageway. It is contemplated for the block to be fabricated from a resilient material.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE DRA WINGS

Figures 1, 2, 3:
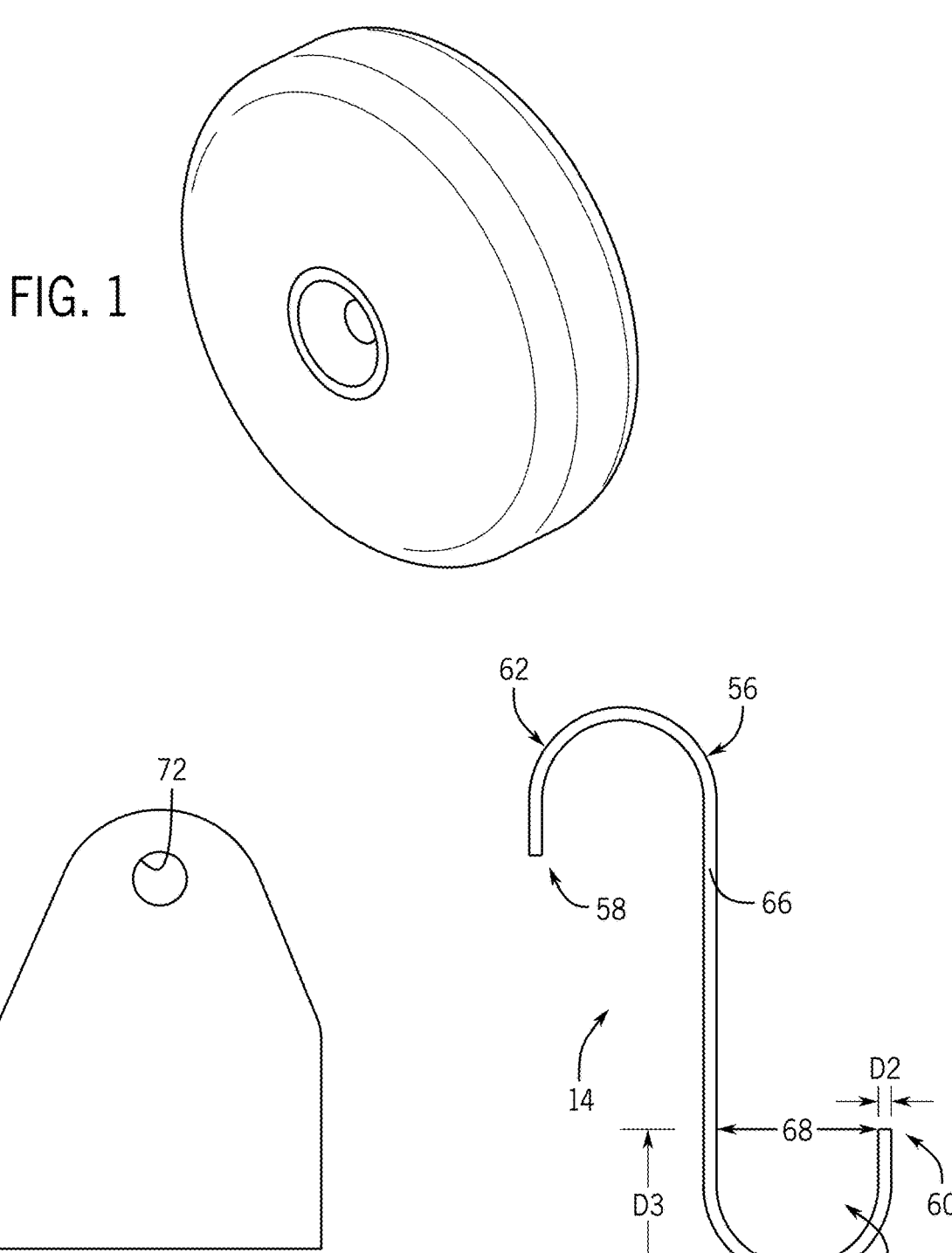
FIG. 1 is an isometric view of a hook look in accordance with the present invention.
FIG. 2 is a front plan view of an exemplary workpiece for use in connection with methodology of the present invention.
FIG. 3 is a side elevational view of a hook for use in connection with methodology of the present invention.
Figure 4:
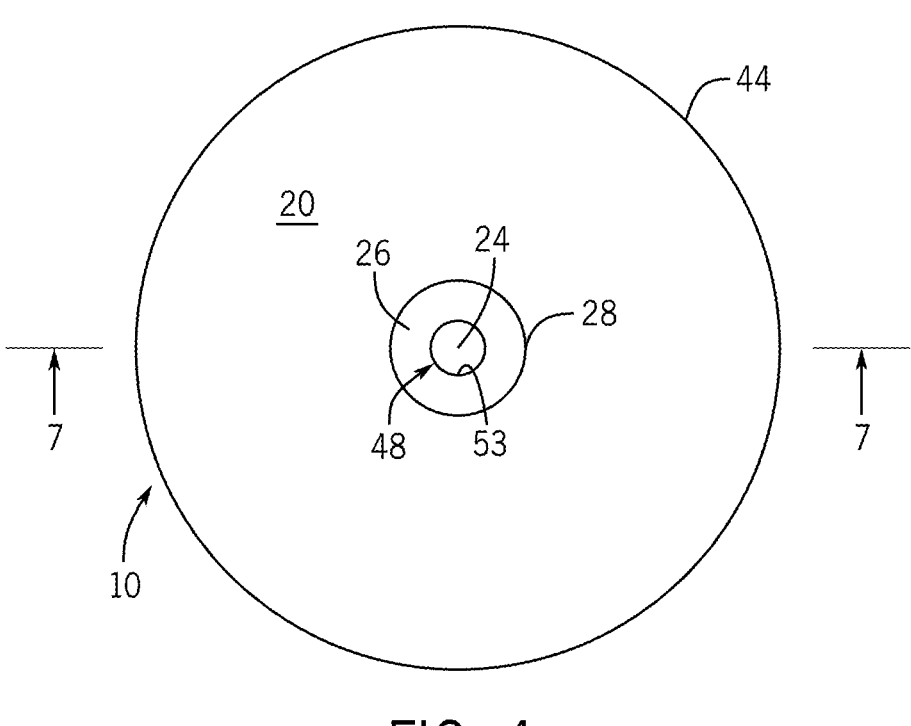
FIG. 4 is a top plan view of the hook lock of FIG. 1.
Figure 5:
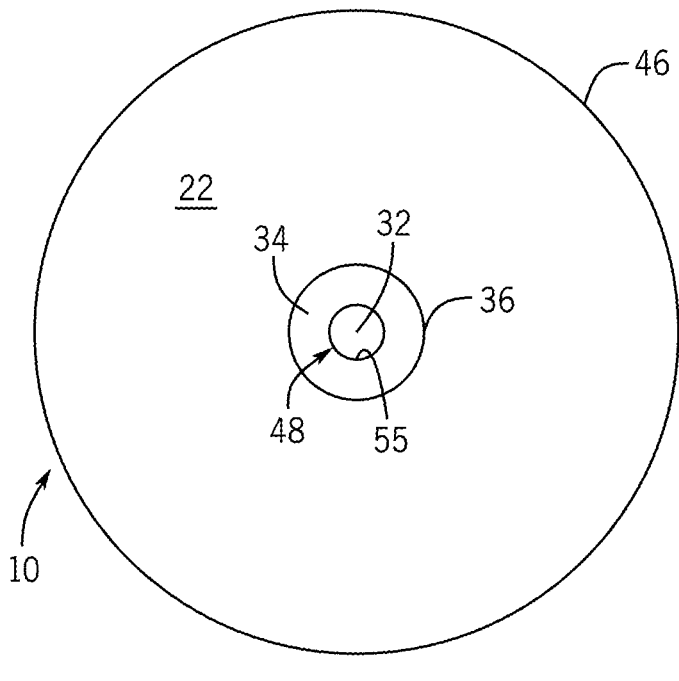
FIG. 5 is a bottom plan view of the hook lock of FIG. 1.
Figure 6:
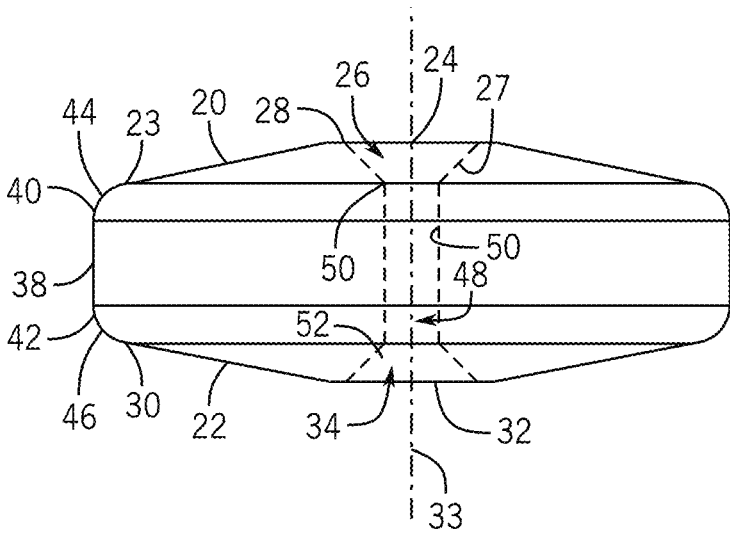
FIG. 6 is a side elevational view of the hook lock of FIG. 1.
Figure 7:
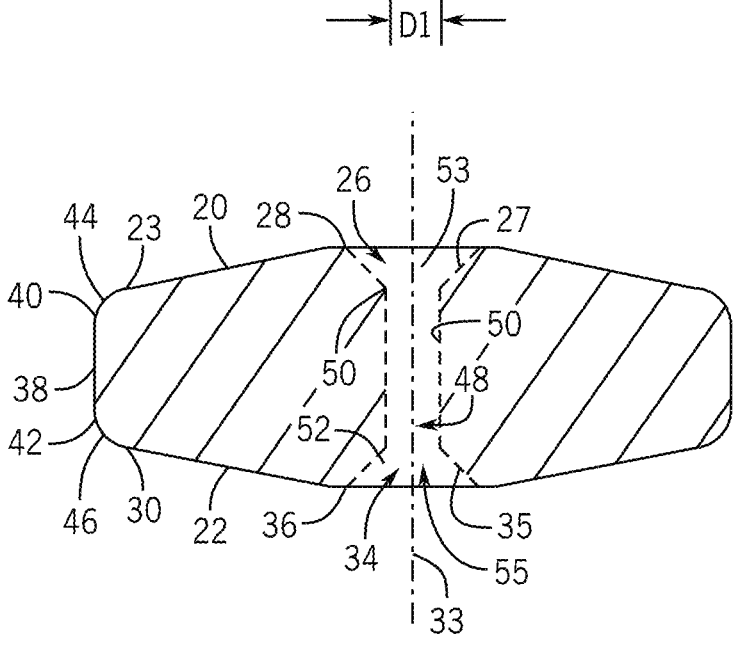
FIG. 7 is cross-sectional view of the hook lock of the present invention taken along line 7-7 of FIG. 5.

Referring to FIGS. 1 and 4-7, a hook lock in accordance with the present invention is generally designated by the reference numeral 10. As hereinafter described, it is intended for hook lock 10 to retain workpiece 12, FIG. 2, on a hook 14, FIG. 3, of an industrial rack (not shown) as the workpiece 12 travels along a line, generally designated by the reference numeral 16, during an industrial coating process, FIG. 8a.

It is contemplated for hook lock 10 to be fabricated from a resilient material, e.g. an elastomer such as silicone rubber. However, hook lock 10 may be fabricated from other materials or combination of materials without deviating from the scope of the present invention. Hook lock 10 is generally disc-shaped and is defined by a convex upper surface 20 and a convex lower surface 22. Upper surface 20 includes outer peripheral edge 23 extending circumferentially about center point 24. Concave depression 26 is provided in upper surface 20 and is defined by concave guide surface 27 having a radially outer edge 28 extending circumferentially about center point 24. Similarly, lower surface 22 includes outer peripheral edge 30 which extends circumferentially about center point 32, which is axially aligned along axis 33 and with center point 24. Concave depression 34 is provided in lower surface 22 and is defined by concave guide surface 35 having a radially outer edge 36 extending circumferentially about center point 32.

Hook lock 10 further includes a generally cylindrical-shaped outer surface 38 having an upper edge 40 and a lower edge 42. Upper edge 40 of outer surface 38 intersects outer peripheral edge 23 of upper surface 20 at intersection 44. Lower edge 42 of outer surface 38 intersects outer peripheral edge 30 of lower surface 22 at intersection 46. Passageway 48 extends through hook lock 10 along axis 33 between guide surface 27 and guide surface 35. Passageway 48 is generally cylindrical in shape and is defined by inner surface 50 having a generally circular upper edge 52 intersecting guide surface 27 and a generally circular lower edge 54 intersecting guide surface 33. It can be appreciated that upper edge 52 defines first opening 53 in communication with passageway 48 and lower edge 54 defines second opening 55 in communication with passageway 48. Passageway 48 has width/diameter D1 less than or equal to width/diameter D2 of shank 56 of hook 14, and preferably, width/diameter D1 is approximately 30% smaller than diameter D2 of shank 56 of hook 14, for reasons hereinafter described.

Referring to FIG. 3, in the depicted embodiment, hook 14 has a generally sinusoidal S-shaped shank 56 having a first end 58 which is configured to be operatively connected to an industrial rack (not shown) and a second end 60. Shank 56 further includes a first bend 62 adjacent the first end 58 thereof and a second bend 64 adjacent the second end 60 thereof. Second bend 64 defines a bite or throat 70 of sufficient depth D3 to allow for workpiece 12 to retained thereon, as hereinafter described. First and second bends 62 and 64, respectively, are spaced by straight portion 66 of shank 56. Second end 60 of shank 56 is spaced from straight portion 66 of shank 56 by gape 68. It is contemplated for second end 60 of shank 56 to be insertable through a corresponding aperture 72 through workpiece 12, FIG. 2, such that workpiece 12 may hang from second bend 64 of hook 14 as workpiece 12 travels along line 16, FIG. 8*a*. It can be appreciated that hook 14 may have other configurations without deviating from the scope of the present invention.

In operation, a workpiece, e.g. exemplary workpiece 12, is hung on second bend 64 of hook 14. More specifically, second end 60 of shank 56 is inserted through aperture 72 in workpiece 12 such that workpiece 12 is retained on second bend 64 of hook 14. Hook lock 10 is positioned such that one of first and second openings 53 and 55 to passageway 48 in hook lock 10 is adjacent to and axially aligned with second end 60 of shank 56 of hook 14. Guide surface 27 is intended to facilitate the alignment of first opening 53 with second end 60 of shank 56 of hook 14. More specifically, a user may slide guide surface 27 of hook lock 10 to be aligned first opening 53 with second end 60 of shank 56 of hook 14. Similarly, guide surface 33 is intended to facilitate the alignment of second opening 55 with second end 60 of shank 56 of hook 14. More specifically, a user may slide guide surface 33 of hook lock 10 to be aligned second opening 55 with second end 60 of shank 56 of hook 14.

Figures 8A, 8B:
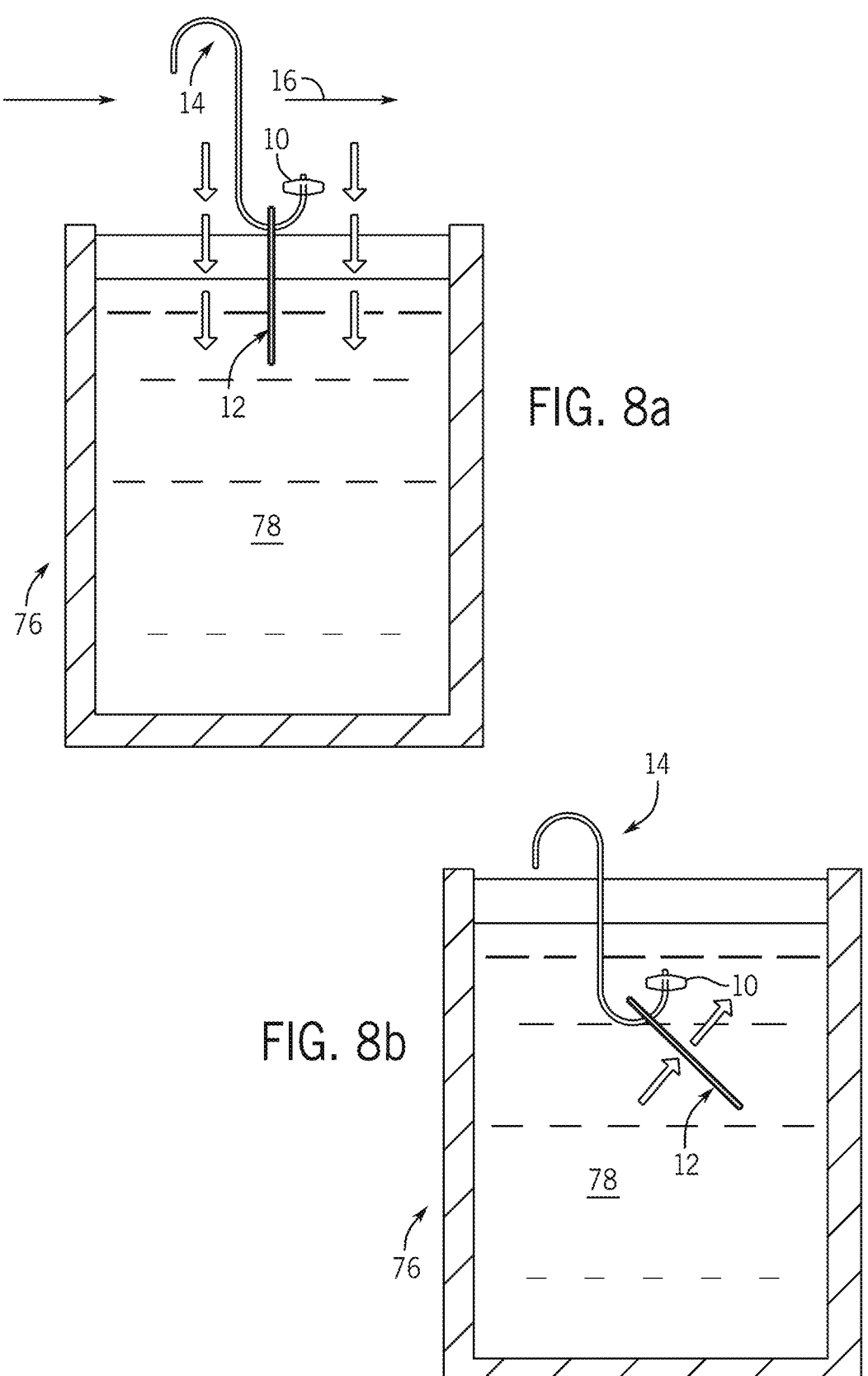
FIG. 8a is a schematic view depicting a first step in the methodology of the present invention.
FIG. 8b is a schematic view depicting a second step in the methodology of the present invention.

With the selected one of first and second openings 53 and 55, respectively, of hook lock 10 axially aligned with second end 60 of shank 56 of hook 14, hook lock 10 is press fit onto hook 14 such that second end 60 of shank 56 of hook 14 extends through passageway 48 and out of the other of first and second openings 53 and 55, respectively, of hook lock 10, FIG. 8*a*. It can be understood that because width/diameter D1 of passageway 48 of hook lock 10 is less than or equal to width/diameter D2 of shank 56 of hook 14, hook lock 10 is frictionally retained on shank 56 at a location adjacent to second end 60 of shank 56 of hook 14. With hook lock 10 frictionally retained on shank 56, workpiece 12 is captured on hook 14 between hook look 10 and the industrial rack (not shown) to which first end 58 of shank 56 of hook 14 is attached. Preferably, as noted above, workpiece 12 hangs from second bend 64 of hook 14.

Figure 8C:
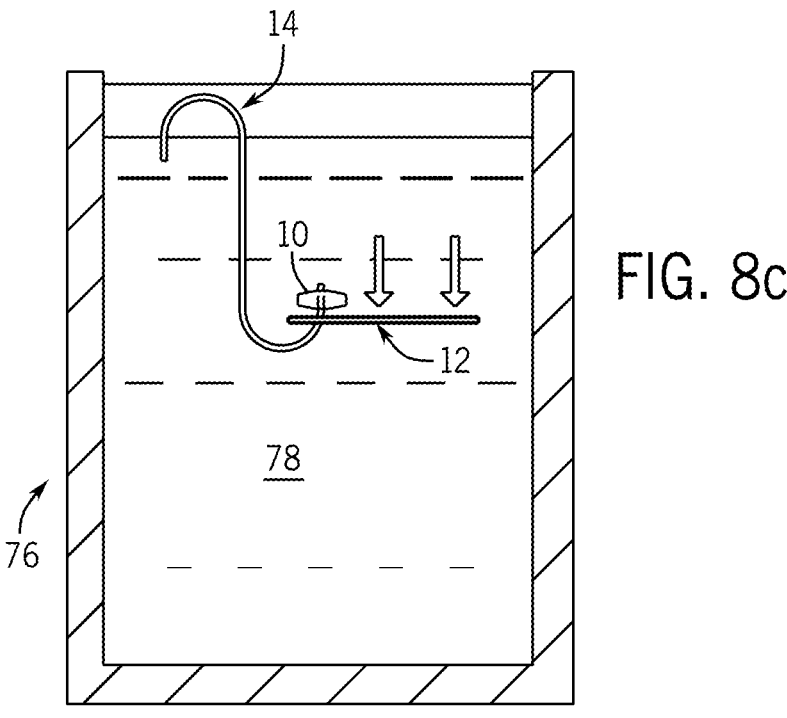
FIG. 8c is a schematic view depicting a third step in the methodology of the present invention.
Figure 8D:
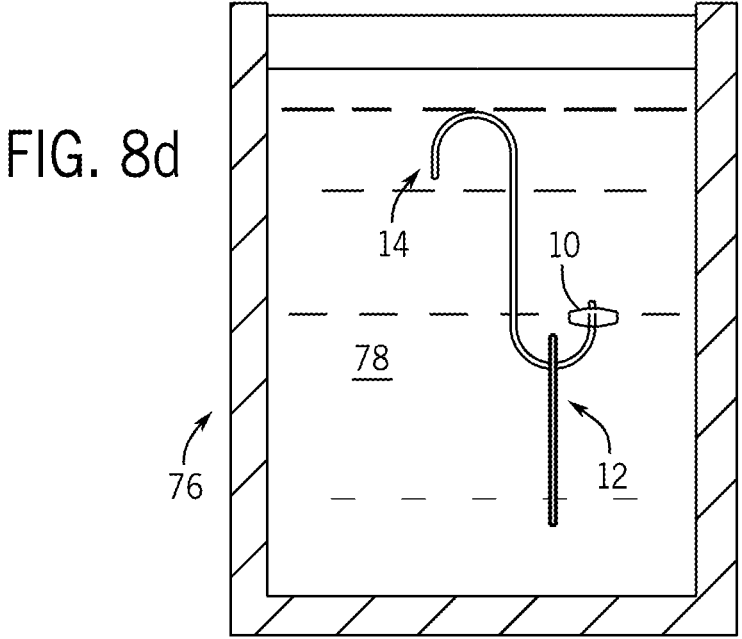
FIG. 8d is a schematic view depicting a first step in the methodology of the present invention.

With workpiece 12 hanging from second bend 64 of hook 14, the industrial rack, and hence workpiece 12, is transported along line 16 to an initial position wherein workpiece 12 may be immersed in a first of a series of submersion tanks, e.g. submersion tank 76. As workpiece 12 is lowered in solution 78 in submersion tank 76, the drag on workpiece 12 cause workpiece 12 to descend into solution 78 at a slower rate than hook 14, FIG. 8*b*. It can be understood that hook lock 14 prevents workpiece 12 from reaching and falling off second end 60 of shank 14, FIG. 8*c*. This, in turn, allows workpiece 12 to be retained on hook 14, and over time, return to its initial position hanging from second bend 64 of hook 14, FIG. 8*d*. After a period of time, workpiece 12 is removed from submersion tank 76 and continues along line 16 wherein workpiece 12 may be immersed or dipped in a subsequent submersion tank. It can be appreciated that hook look 10 also prevents workpiece 12 from being blown or vibrated off hook 14 as workpiece 12 travels along line 16.

Once the industrial coating process has been completed, a user may simply slide hook lock 10 off second end 60 of shank 56 of hook 14, thereby allowing workpiece 12 to be removed from hook 14. Once hook lock 10 is removed from hook 14, the process may be repeated such that hook look 10 may be used once again to retain a subsequent workpiece 12 on hook 14 during the industrial coating process. As described, the installation and removal of hook lock 10 on hook 14 provides a quick, simple, and easy mechanism and process for retaining workpiece 12 on hook 14 of an industrial rack as workpiece 12 travels along line 16 during an industrial coating process.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

I claim:

1. A method for retaining a workpiece on a hook of an industrial rack, the hook including a shank having a cross-sectional width and terminating at a terminal end, the method comprising the steps of:

inserting the terminal end of the hook through the workpiece; and inserting the terminal end of the hook through a passageway extending through a block, the passageway having a cross-sectional width less than or equal to the cross-sectional width of the shank such that the block is frictionally retained on the shank of the hook.

2. The method of claim 1 wherein the block has a first generally convex outer surface and a second generally convex outer surface.

3. The method of claim 2 wherein the passageway extends along an axis between the first and second outer surfaces of the block and includes a first open end and a second open end.

4. The method of claim 3 wherein the block includes a concave depression in the first outer surface, the concave depression defined by a guide surface extending about the first open end of the passageway.

5. The method of claim 4 comprising the additional step of guiding the terminal end of the hook along the guide surface to the first open end of the passageway prior to inserting the terminal end of the hook through the passageway.

6. The method of claim 3 wherein:

the concave depression is a first concave depression and the guide surface is a first guide surface; and the block includes a second concave depression in the second outer surface, the second concave depression defined by a second guide surface extending about the second open end of the passageway.

7. The method of claim 6 comprising the additional step of guiding the terminal end of the hook along the second guide surface to the second open end of the passageway prior to inserting the terminal end of the hook through the passageway.

8. A method for maintaining a workpiece on a hook of an industrial rack as the workpiece travels along a line during industrial coating process, the hook including a shank having a cross-sectional width and terminating at a terminal end, the method comprising the steps of:

inserting the terminal end of the hook through the work-piece;

inserting the terminal end of the hook through a passage-way extending through a block, the passageway having a cross-sectional width less than or equal to the cross-sectional width of the shank such that the block is frictionally retained on the shank of the hook;

preventing the workpiece from being disengaged from the hook with the block as the workpiece is transported along the line;

removing the block from the shank of the hook; and removing the workpiece from the hook.

9. The method of claim 8 wherein the block has a first generally convex outer surface and a second generally convex outer surface.

10. The method of claim 9 wherein the passageway extends along an axis between the first and second outer surfaces of the block and includes a first open end and a second open end.

11. The method of claim 10 wherein the block includes a concave depression in the first outer surface, the concave depression defined by a guide surface extending about the first open end of the passageway.

12. The method of claim 11 comprising the additional step of guiding the terminal end of the hook along the guide surface to the first open end of the passageway prior to inserting the terminal end of the hook through the passage-way.

13. The method of claim 11 wherein:

the concave depression is a first concave depression and the guide surface is a first guide surface; and the block includes a second concave depression in the second outer surface, the second concave depression defined by a second guide surface extending about the second open end of the passageway.

14. The method of claim 13 comprising the additional step of guiding the terminal end of the hook along the second guide surface to the second open end of the passageway prior to inserting the terminal end of the hook through the passageway.

15. The method of claim 8 wherein the block is fabricated from a resilient material.

* * * * *